US010210886B2

United States Patent
Miyamori et al.

(10) Patent No.: US 10,210,886 B2
(45) Date of Patent: Feb. 19, 2019

(54) VOICE SEGMENT DETECTION SYSTEM, VOICE STARTING END DETECTION APPARATUS, AND VOICE TERMINAL END DETECTION APPARATUS

(71) Applicant: KABUSHIKI KAISHA TOSHIBA, Tokyo (JP)

(72) Inventors: Shoko Miyamori, Kanagawa (JP); Mitsuyoshi Tachimori, Kanagawa (JP); Kouji Ueno, Shizuoka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

(21) Appl. No.: 15/391,143

(22) Filed: Dec. 27, 2016

(65) Prior Publication Data

US 2017/0110146 A1   Apr. 20, 2017

Related U.S. Application Data

(63) Continuation of application No. PCT/JP2015/076121, filed on Sep. 15, 2015.

(30) Foreign Application Priority Data

Sep. 17, 2014 (JP) ................................ 2014-188890

(51) Int. Cl.
  *G10L 15/30* (2013.01)
  *G10L 25/78* (2013.01)
  *G10L 25/87* (2013.01)
(52) U.S. Cl.
  CPC .............. *G10L 25/87* (2013.01); *G10L 15/30* (2013.01); *G10L 25/78* (2013.01)
(58) Field of Classification Search
  CPC .......... G10L 15/30; G10L 25/78; G10L 25/87
  (Continued)

(56) References Cited

U.S. PATENT DOCUMENTS 7,478,046 B2   1/2009 Yamada et al.
9,444,816 B2 *  9/2016 Johnsgard .......... G07C 9/00158
(Continued)

FOREIGN PATENT DOCUMENTS

JP   2001-343983   12/2001
JP   2003-5949   1/2003
(Continued)

OTHER PUBLICATIONS

International Search Report issued by the Japanese Patent Office in International Application No. PCT/JP2015/076121, dated Dec. 15, 2015 (1 page).

*Primary Examiner* — James S Wozniak
(74) *Attorney, Agent, or Firm* — Finnegan, Henderson, Farabow, Garrett & Dunner, L.L.P.

(57) ABSTRACT

A voice starting end detection apparatus includes a first detector that detects a starting end of a voice segment from input signals that are input in a time series, a first transmitting unit that transmits, when the starting end is detected, input signals subsequent to the starting end, and a first receiving unit that receives a terminal end detection signal indicating that a terminal end of the voice segment has been detected. The voice terminal end detection apparatus includes a second receiving unit that receives input signals subsequent to the starting end, a second detector that detects the terminal end from the received input signals, a second transmitting unit that transmits, when the terminal end is detected, the terminal end detection signal. The first transmitting unit stops transmitting the input signals when the first receiving unit receives the terminal end detection signal.

6 Claims, 6 Drawing Sheets

(58) Field of Classification Search
USPC .............................................. 704/233, 270.1
See application file for complete search history.

(56) References Cited

U.S. PATENT DOCUMENTS

| | | | | |
|---|---|---|---|---|
| 9,818,407 | B1* | 11/2017 | Secker-Walker | G10L 15/28 |
| 2003/0061036 | A1* | 3/2003 | Garudadri | G10L 15/30 |
| | | | | 704/208 |
| 2003/0115045 | A1* | 6/2003 | Harris | G10L 21/0364 |
| | | | | 704/214 |
| 2007/0168591 | A1* | 7/2007 | Chua | G10L 25/69 |
| | | | | 710/72 |
| 2011/0264447 | A1* | 10/2011 | Visser | G10L 25/78 |
| | | | | 704/208 |
| 2013/0132089 | A1* | 5/2013 | Fanty | G10L 21/00 |
| | | | | 704/270 |
| 2014/0236601 | A1* | 8/2014 | Nagata | G06T 1/20 |
| | | | | 704/254 |
| 2015/0206544 | A1* | 7/2015 | Carter | G10L 25/78 |
| | | | | 704/235 |
| 2016/0125883 | A1* | 5/2016 | Koya | G10L 15/30 |
| | | | | 704/232 |
| 2016/0210283 | A1* | 7/2016 | Kim | G06F 17/289 |
| 2016/0379632 | A1* | 12/2016 | Hoffmeister | G10L 15/18 |
| | | | | 704/253 |

FOREIGN PATENT DOCUMENTS

| | | |
|---|---|---|
| JP | 2003-195880 | 7/2003 |
| JP | 2005-331616 | 12/2005 |
| JP | 4197271 | 12/2008 |
| JP | 4425055 | 3/2010 |

* cited by examiner

VOICE SEGMENT DETECTION SYSTEM, VOICE STARTING END DETECTION APPARATUS, AND VOICE TERMINAL END DETECTION APPARATUS

CROSS-REFERENCE TO RELATED APPLICATIONS

This application is a continuation of PCT international Application Ser. No. PCT/JP2015/076121, filed on Sep. 15, 2015, which designates the United States and which claims the benefit of priority from Japanese Patent Application No. 2014-188890, filed on Sep. 17, 2014; the entire contents of which are incorporated herein by reference.

FIELD

Embodiments described herein relate generally to a voice segment detection system, a voice starting end detection apparatus, and a voice terminal end detection apparatus.

BACKGROUND

Known is a system such as a server-client voice recognition system in which a server device performs a predetermined process to the voice input to a client terminal. In this type of system, to reduce the amount of communication from the client terminal to the server device, the client terminal executes a process of detecting a voice segment that is voice part uttered by a person from the input signals, and transmitting only signals corresponding to the detected voice segment to the server device. However, because the client terminal has limited resources compared with the server device, the client terminal is often incapable of detecting a voice segment at a sufficient accuracy, and some voice may be left out without being transmitted. To address this issue, there has been a demand for the development of a new mechanism for reducing the voice left out without being transmitted while suppressing the amount of communication at the same time.

DETAILED DESCRIPTION

According to one embodiment, a voice segment detection system includes a voice starting end detection apparatus and a voice terminal end detection apparatus. The voice starting end detection apparatus includes a first detector that detects a starting end of a voice segment from input signals that are input in a time series, a first transmitting unit that transmits, when the starting end is detected, input signals subsequent to the starting end to the voice terminal end detection apparatus, and a first receiving unit that receives a terminal end detection signal indicating that a terminal end of the voice segment has been detected from the voice terminal end detection apparatus. The voice terminal end detection apparatus includes a second receiving unit that receives input signals subsequent to the starting end from the voice starting end detection apparatus, a second detector that detects the terminal end from the received input signals, a second transmitting unit that transmits, when the terminal end is detected, the terminal end detection signal to the voice starting end detection apparatus. The first transmitting unit stops transmitting the input signals when the first receiving unit receives the terminal end detection signal.

A voice segment detection system according to the embodiment detects a voice segment from signals that include voice, and that are input in the time series from an input device such as a microphone (hereinafter, referred to as input signals), by causing a voice starting end detection apparatus and a voice terminal end detection apparatus that are communicatively connected to each other to work cooperatively. The voice starting end detection apparatus performs a process of detecting a starting end of a voice segment (hereinafter, referred to as a voice starting end) from the input signals, and, upon detecting a voice starting end, transmits the input signals that are subsequent to the voice starting end to the voice terminal end detection apparatus. The voice terminal end detection apparatus then performs a process of detecting the terminal end of the voice segment (hereinafter, referred to as a voice terminal end) from the input signals received from the voice starting end detection apparatus, that is, the input signals subsequent to the voice starting end detected by the voice starting end detection apparatus, and upon detecting the terminal end, transmits a terminal end detection signal to the voice starting end detection apparatus. When the terminal end detection signal is received from the voice terminal end detection apparatus, the voice starting end detection apparatus stops transmitting the input signals to the voice terminal end detection apparatus.

The voice segment detection system according to the embodiment can be implemented as, for example, a server-client system including the voice starting end detection apparatus as a client terminal, and the voice terminal end detection apparatus as a server device. In such a configuration, any device with a function of connecting to a communication network may be used as the client terminal, such as a personal computer having an external connection terminal to which an externally attached microphone is connected, a mobile telephone, a smartphone, a tablet terminal, a teleconference terminal configured as a terminal of a teleconference (video conference) system, such devices being provided with an internal microphone. Such a device to be used as the client terminal has resources such as a processor or a memory for implementing an ordinary computer system, and implements the function as the voice starting end detection apparatus by executing a predetermined computer program on the computer system, as an example. The server device is a server computer deployed on a communication network and having resources such as a processor or a memory for implementing an ordinary computer system, and implements the function as the voice terminal end detection apparatus by executing a predetermined computer program on the computer system, for example. The server device implementing the function of the voice terminal end detection apparatus may be a virtual machine operating in a cloud system.

In the conventional server-client system in which the server device performs a predetermined process to the voice input to the client terminal, to reduce the amount of communication from the client terminal to the server device, the client terminal detects a voice starting end and a voice terminal end (that is, a voice segment) from the input signals, and transmits the signals representing the detected voice segment to the server device. Therefore, the process performed by the client apparatus has determined the signal representing the voice segment transmitted from the client terminal to the server device. However, because the client terminal has limited resources compared with the server device, the client terminal is often incapable of detecting a voice segment at a sufficient accuracy. As a result, the client terminal may determine a part corresponding to the voice in the input signal as a non-voice segment, and the voice may be left out without being transmitted.

By contrast, in the voice segment detection system according to the embodiment, a voice segment is detected by causing the voice starting end detection apparatus and the voice terminal end detection apparatus to work cooperatively, and a signal at least including the voice segment is transmitted from the voice starting end detection apparatus to the voice terminal end detection apparatus. In other words, the voice terminal end detection apparatus, which has sufficient resources compared with the voice starting end detection apparatus, is caused to detect the voice terminal end highly accurately, and the result is fed-back to the voice starting end detection apparatus to cause the voice starting end detection apparatus to determine the range of the signals that are to be transmitted from the voice starting end detection apparatus to the voice terminal end detection apparatus. Therefore, with the voice segment detection system according to the embodiment, the voice left out without being transmitted can be reduced effectively, while effectively suppressing the amount of communication from the voice starting end detection apparatus to the voice terminal end detection apparatus.

The signals representing voice segment detected by the voice segment detection system according to the embodiment may be used in various applications. In a configuration in which the voice segment detection system according to the embodiment is used in a server-client voice recognition system, for example, the server device executes the voice recognition process to the detected signals representing the voice segment, and the text data resultant of the recognition is transmitted to the client terminal. In a configuration in which the voice segment detection system according to the embodiment is used in a server-client voice accumulation system, the detected signals representing the voice segment are stored in the server device as a piece of recorded data. It is also possible to transmit the signal representing a voice segment detected by the voice segment detection system to another application server making use of such signals.

When the voice segment detection system according to the embodiment is implemented as a server-client system, a large number of voice starting end detection apparatuses can be connected to a voice terminal end detection apparatus. In such a configuration, the voice terminal end detection apparatus executes the processes corresponding to the respective voice starting end detection apparatuses connected thereto in parallel. The voice terminal end detection apparatus may authenticate or manage the voice starting end detection apparatuses using pieces of unique identification information that are preassigned to the respective voice starting end detection apparatuses, for example.

Some specific examples of the voice segment detection system according to the embodiment will be explained in detail with reference to drawings.

First Embodiment

Figure 1:
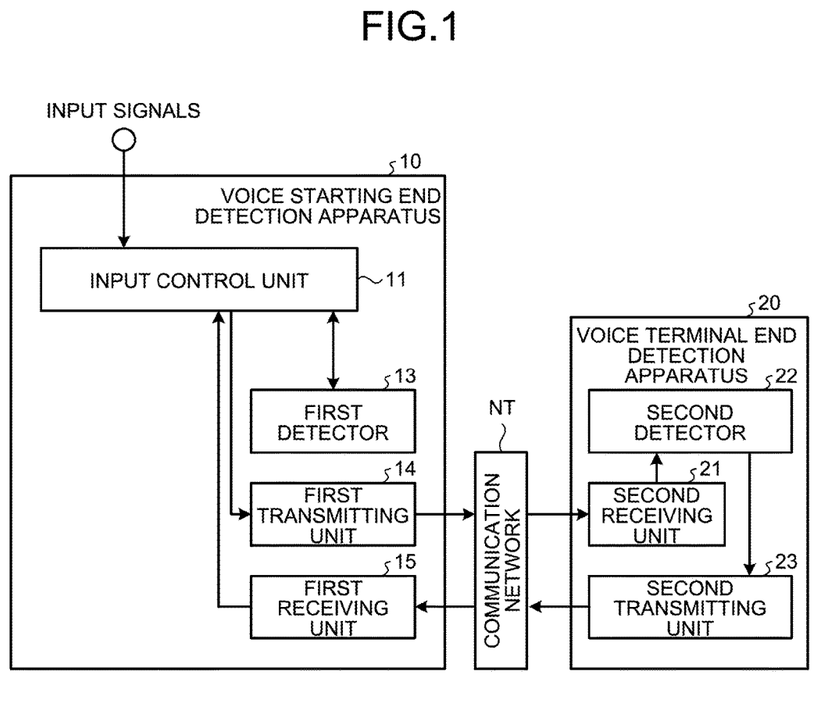
FIG. 1 is a block diagram illustrating an exemplary configuration of a voice segment detection system according to a first embodiment.

FIG. 1 is a block diagram illustrating an exemplary configuration of a voice segment detection system according to a first embodiment of the present invention. The voice segment detection system according to the embodiment includes, as illustrated in FIG. 1, a voice starting end detection apparatus 10 and a voice terminal end detection apparatus 20 that are communicatively connected to each other over a communication network NT.

As illustrated in FIG. 1, the voice starting end detection apparatus 10 includes an input control unit 11, a first detector 13, a first transmitting unit 14, and a first receiving unit 15.

The input control unit 11 retains a current status of a voice segment detection, that is, indicating whether neither a voice starting end nor a voice terminal end has not been detected yet, or a voice starting end has been detected but voice terminal end has not been detected yet, and controls the flow of the input signals input from the input device such as a microphone in the time series, based on the status. The input signal is not be limited to signals input from the input device such as a microphone. For example, the input signal may also be any signals such as signals read by a computer program from recorded data, for example.

If the current detection status of a voice segment indicates that neither a voice starting end nor a voice terminal end has been detected yet, the input control unit 11 passes the input signal to the first detector 13. If the current detection status of a voice segment indicates that a voice starting end has been detected but voice terminal end has not been detected yet, the input control unit 11 passes the input signals to the first transmitting unit 14. If the input control unit 11 recognizes that the voice terminal end has been detected via the terminal end detection signal which is described later, the input control unit 11 stops supplying the input signals to the first transmitting unit 14. When the detection of a voice segment is then to be newly started, e.g., when the detection of a subsequent voice segment is requested, the input control unit 11 starts passing the input signals to the first detector 13 again, assuming that the voice starting end is undetected yet.

The first detector 13 executes a process of detecting a voice starting end from the input signals received from the input control unit 11. As a process executed by the first detector 13, a method with a relatively low processing load may be used, among various voice segment detection methods that are known. For example, the first detector 13 may use a method for detecting a voice starting end by comparing the power of the input signals with a threshold. When the first detector 13 detects a voice starting end, information indicating that the voice starting end has been detected is communicated to the input control unit 11. The input control unit 11 recognizes that the voice starting end has been detected based on this information, and switches the unit to which the input signals are to be supplied to the first transmitting unit 14 from the first detector 13. It is preferable for the information that is to be communicated to the input control unit 11 when the first detector 13 has detected the voice starting end to include information indicating the position of the detected voice starting end along the time axis (starting end position). With such information, the input control unit 11 can recognize the starting end position.

The first transmitting unit 14 transmits the input signals received from the input control unit 11 to the voice terminal end detection apparatus 20 over the communication network NT. When a voice starting end has been detected by the first detector 13, the input control unit 11 passes the input signals subsequent to the detected voice starting end to the first transmitting unit 14. Therefore, the first transmitting unit 14 transmits the input signals subsequent to the voice starting end, which has been detected by the first detector 13, to the voice terminal end detection apparatus 20.

The first receiving unit 15 receives a terminal end detection signal transmitted from the voice terminal end detection apparatus 20 over the communication network NT. The transmission of the terminal end detection signal is triggered when the voice terminal end is detected by the voice terminal end detection apparatus 20, in the manner described later. After the terminal end detection signal is transmitted from the voice terminal end detection apparatus 20, the first receiving unit 15 receives the terminal end detection signal, and passes the signal to the input control unit 11. The input control unit 11 then recognizes that the voice terminal end has been detected based on the terminal end detection signal.

When the input control unit 11 recognizes that the voice terminal end has been detected, the input control unit 11 stops supplying the input signals to the first transmitting unit 14. Therefore, when the first receiving unit 15 receives the terminal end detection signal transmitted from the voice terminal end detection apparatus 20, the first transmitting unit 14 stops transmitting the input signals to the voice terminal end detection apparatus 20.

The voice terminal end detection apparatus 20 includes, as illustrated in FIG. 1, a second receiving unit 21, a second detector 22, and a second transmitting unit 23.

The second receiving unit 21 receives the input signals transmitted from the voice starting end detection apparatus 10 over the communication network NT. The input signals transmitted from the voice starting end detection apparatus 10 are the input signals subsequent to the voice starting end detected by the first detector 13, among the input signals input to the voice starting end detection apparatus 10 in the time series, as mentioned earlier. The second receiving unit 21 receives the input signals subsequent to the voice starting end from the voice starting end detection apparatus 10. The input signals received by the second receiving unit 21 are passed to the second detector 22.

The second detector 22 executes the process of detecting a voice terminal end from the input signals received by the second receiving unit 21. As the process executed by the second detector 22, a method with a higher processing load but a high detection accuracy may be used, compared with that used by the first detector 13 in the voice starting end detection apparatus 10, among various types of voice segment detection methods that are known. For example, the second detector 22 may use a method for detecting a voice terminal end by removing noise by applying filtering to the input signals, and then comparing the signal power with a threshold, or a method for detecting a voice terminal end using a feature quantity calculated from frequency characteristics or an acoustic model of the voice. As described above, because the voice terminal end detection apparatus 20 is assumingly be implemented as a server device with sufficient resources and a high processing performance, highly accurate detection can be performed appropriately (without introducing a large delay), using a method accruing a high processing load. When the voice terminal end is detected by the second detector 22, the information is communicated to the second transmitting unit 23.

When the second detector 22 detects the voice terminal end, the second transmitting unit 23 generates a terminal end detection signal indicating that the voice terminal end has been detected, and transmits this terminal end detection signal to the voice starting end detection apparatus 10 over the communication network NT. At this time, it is preferable for the second transmitting unit 23 to generate a terminal end detection signal including time information for identifying the position of the voice terminal end detected by the second detector 22 in the time axis (terminal end position). For example, the second transmitting unit 23 acquires relative time representing the time of the terminal end position with reference to the voice starting end that is at the head of the input signals received by the second receiving unit 21 from the second detector 22, and generates the terminal end detection signal in which the relative time is embedded as the time information. When the input signals received by the second receiving unit 21 are given time stamps indicating time, the second transmitting unit 23 may also acquire the time stamp corresponding to the terminal end position from the second detector 22, and generates the terminal end detection signal in which the time stamp is embedded as the time information. By transmitting the terminal end detection signal including such time information to the voice starting end detection apparatus 10, the terminal end position can be notified to the voice starting end detection apparatus 10.

A general operation of the voice segment detection system according to the embodiment having such a configuration will now be explained.

To begin with, input signals start being input to the voice starting end detection apparatus 10. Because any voice starting end is undetected yet at this point in time, the input signals are passed to the first detector 13, and the first detector 13 executes the process of detecting a voice starting end. Once the first detector 13 detects a voice starting end, the first transmitting unit 14 transmits the input signals subsequent to the voice starting end to the voice terminal end detection apparatus 20.

In the voice terminal end detection apparatus 20, when the input signals subsequent to the voice starting end are received by the second receiving unit 21, the input signals are passed to the second detector 22, and the second detector 22 performs the process of detecting the voice terminal end. When the second detector 22 detects the voice terminal end, the terminal end detection signal is transmitted from the second transmitting unit 23 to the voice starting end detection apparatus 10. When the first receiving unit 15 in the voice starting end detection apparatus 10 receives the terminal end detection signal, the transmission of the input signals from the first transmitting unit 14 to the voice terminal end detection apparatus 20 is stopped.

Figure 2:
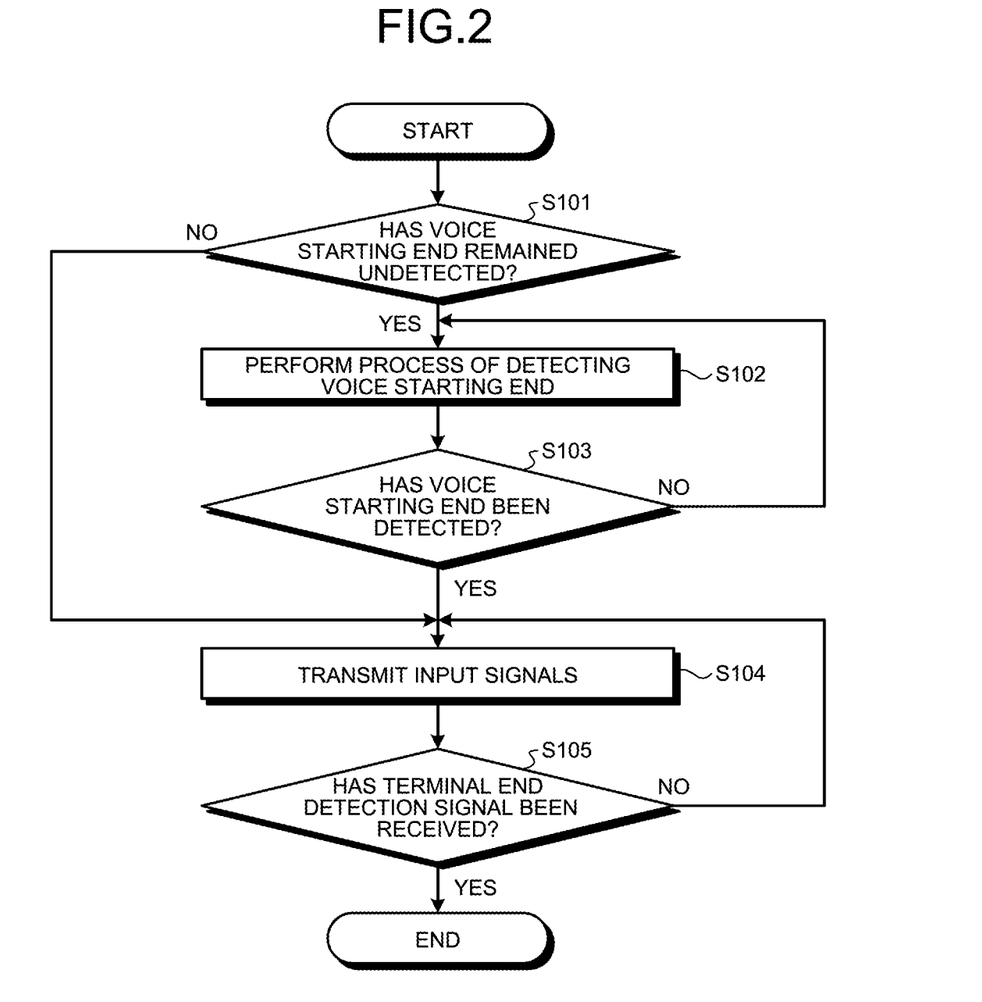
FIG. 2 is a flowchart illustrating an exemplary procedure of a process performed in a voice starting end detection apparatus.

A procedure of a process performed in the voice starting end detection apparatus 10 will now be explained with reference to FIG. 2. FIG. 2 is a flowchart illustrating an exemplary procedure of a process performed in the voice starting end detection apparatus 10. The series of processes illustrated in the flowchart of FIG. 2 is started when an input signal is input to the voice starting end detection apparatus 10.

When input signals are input to the voice starting end detection apparatus 10, to begin with, the input control unit 11 determines whether a voice starting end has remained undetected (Step S101). If a voice starting end has not remained undetected (No at Step S101), the input control unit 11 passes the input signals to the first transmitting unit 14. The process is then shifted to Step S104. If a voice starting end has remained undetected (Yes at Step S101), the input control unit 11 passes the input signals to the first detector 13. In this case, the first detector 13 executes the process of detecting a voice starting end from the input signals received from the input control unit 11 (Step S102).

The input control unit 11 then determines whether the first detector 13 has detected a voice starting end (Step S103). If a voice starting end has not been detected (No at Step S103), the input control unit 11 keeps supplying the input signals to the first detector 13. In this manner, the process of detecting a voice starting end performed by the first detector 13 at Step S102 is continued. If a voice starting end has been detected by the first detector 13 (Yes at Step S103), the input control unit 11 passes the input signals subsequent to the detected voice starting end to the first transmitting unit 14. The process is then shifted to Step S104.

At Step S104, the first transmitting unit 14 transmits the input signals received from the input control unit 11 to the voice terminal end detection apparatus 20 over the communication network NT. Following the procedure described above, the input signals subsequent to the voice starting end detected by the first detector 13 are transmitted to the voice terminal end detection apparatus 20.

The input control unit 11 then determines whether the first receiving unit 15 has received the terminal end detection signal from the voice terminal end detection apparatus 20 (Step S105). If any terminal end detection signal has not been received (No at Step S105), the input control unit 11 keeps supplying the input signal to the first transmitting unit 14. In this manner, the input signal transmission process performed by the first transmitting unit 14 at Step S104 is continued. If the first receiving unit 15 has received a terminal end detection signal (Yes at Step S105), the transmission of the input signals from the first transmitting unit 14 to the voice terminal end detection apparatus 20 is stopped, by causing the input control unit 11 to stop supplying the input signals to the first transmitting unit 14, and the series of processes is ended.

Figure 3:
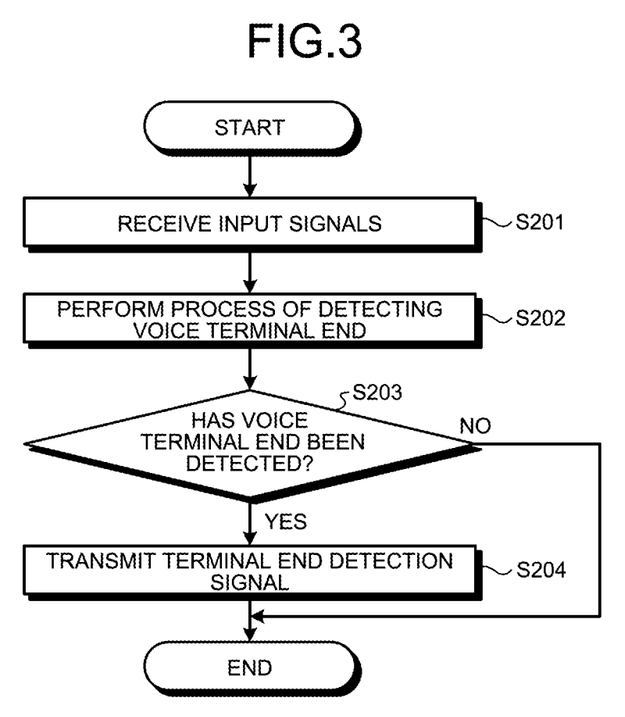
FIG. 3 is a flowchart illustrating an exemplary procedure of a process performed in a voice terminal end detection apparatus.

A procedure of a process performed in the voice terminal end detection apparatus 20 will now be explained with reference to FIG. 3. FIG. 3 is a flowchart illustrating an exemplary procedure of a process performed in the voice terminal end detection apparatus 20. The series of processes illustrated in the flowchart of FIG. 3 is repeated every time the voice starting end detection apparatus 10 transmits the input signals to the voice terminal end detection apparatus 20.

When the voice starting end detection apparatus 10 transmits the input signals, to begin with, the second receiving unit 21 receives the input signals (Step S201), and passes the signals to the second detector 22. The second detector 22 executes the process of detecting the voice terminal end from the input signals passed from the second receiving unit 21 (Step S202). If no voice terminal end is detected by the second detector 22 (No at Step S203), the process is ended as it is. If a voice terminal end is detected by the second detector 22 (Yes at Step S203), the second transmitting unit 23 generates a terminal end detection signal, and transmits the terminal end detection signal to the voice starting end detection apparatus 10 (Step S204), and the process is ended.

As described above using a specific example, in the voice segment detection system according to the embodiment, the input voice subsequent to the voice starting end detected by the voice starting end detection apparatus 10 is transmitted to the voice terminal end detection apparatus 20. If the voice terminal end detection apparatus 20 detects the voice terminal end from the input signals, the transmission of the input signals from the voice starting end detection apparatus 10 to the voice terminal end detection apparatus 20 is stopped. Therefore, with the voice segment detection system, the voice left out without being transmitted can be reduced effectively, while suppressing the amount of communication from the voice starting end detection apparatus 10 to the voice terminal end detection apparatus 20.

Second Embodiment

A voice segment detection system according to a second embodiment of the present invention will now be explained. In the voice segment detection system according to the embodiment, the voice starting end detection apparatus also detects a voice terminal end, and, when the voice terminal end is detected, the voice starting end detection apparatus interrupts the transmission of the input signals to the voice terminal end detection apparatus. The voice terminal end detection apparatus, by contrast, performs the process of detecting the voice terminal end from the input signals received from the voice starting end detection apparatus, in the same manner as in the first embodiment, but if no voice terminal end is detected from the received input signals, the voice terminal end detection apparatus requests the voice starting end detection apparatus to restart the transmission of the input signals. In response to the request from the voice terminal end detection apparatus, the voice starting end detection apparatus transmits the input signals subsequent to the time at which the signal transmission is interrupted, to the voice terminal end detection apparatus. In this manner, the amount of communication from the voice starting end detection apparatus to the voice terminal end detection apparatus can be further reduced, compared with the first embodiment.

Figure 4:
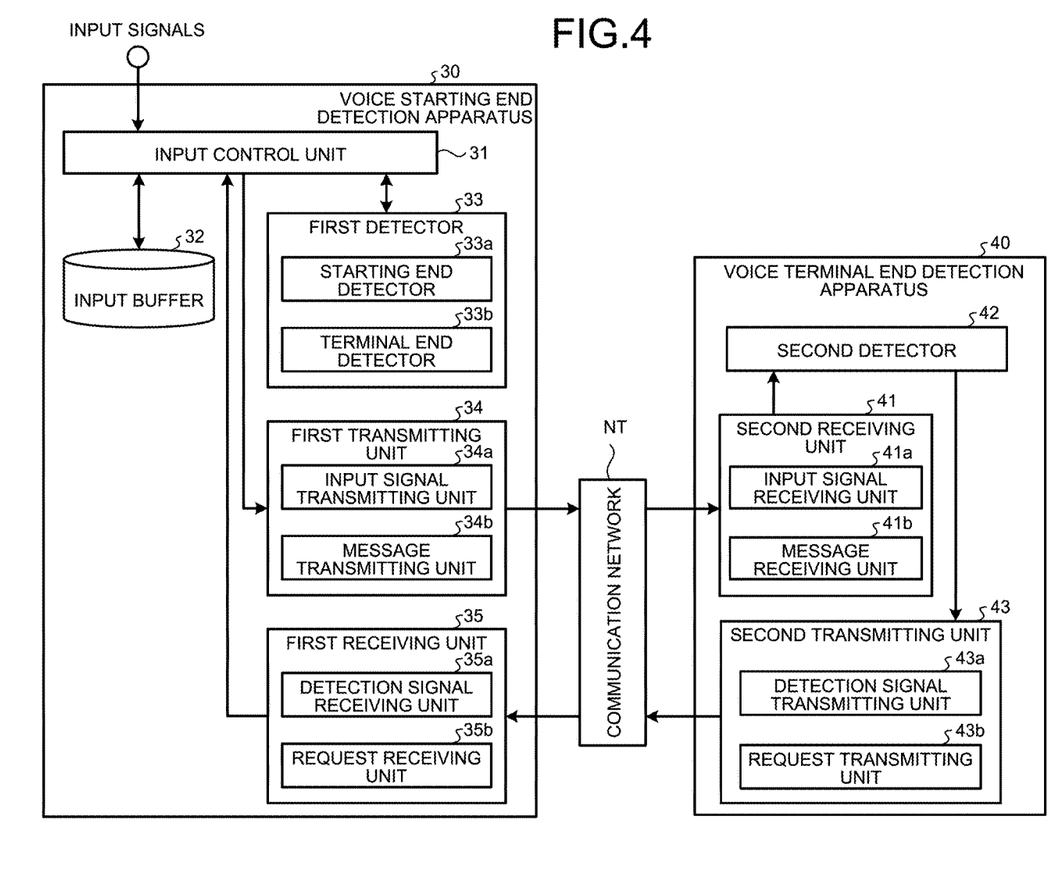
FIG. 4 is a block diagram illustrating an exemplary configuration of a voice segment detection system according to a second embodiment.

FIG. 4 is a block diagram illustrating an exemplary configuration of a voice segment detection system according to the second embodiment. As illustrated in FIG. 4, the voice segment detection system according to the embodiment includes a voice starting end detection apparatus 30 and a voice terminal end detection apparatus 40 that are communicatively connected to each other over the communication network NT.

As illustrated in FIG. 4, the voice starting end detection apparatus 30 includes an input control unit 31, an input buffer 32, a first detector 33, a first transmitting unit 34, and a first receiving unit 35. The input buffer 32 is a buffer in which the input signals input from the input device such as a microphone in the time series are sequentially stored.

The input control unit 31 controls the flow of the input signals input from the input device such as a microphone in the time series, based on the current detection status of the voice segment, in the same manner as the input control unit 11 according to the first embodiment. The input control unit 31 according to the embodiment, however, keeps passing the input signals to the first detector 33 even after the first detector 33 detects a voice starting end. When the first detector 33 then detects a voice terminal end, the input control unit 31 stops supplying the input signals to the first transmitting unit 34, and interrupts the transmission of the input signals from the first transmitting unit 34 to the voice terminal end detection apparatus 40. When the first receiving unit 35 receives a transmission restart request which will be described later, the input control unit 31 according to the embodiment takes out the input signals subsequent to the time at which the transmission is interrupted from the input buffer 32, passes the input signals to the first transmitting unit 34, and causes the first transmitting unit 34 to restart the transmission of the input signals to the voice terminal end detection apparatus 40.

The first detector 33 includes a starting end detector 33a and a terminal end detector 33b. The starting end detector 33a performs the process of detecting a voice starting end from the input signal received from the input control unit 31, in the same manner as the first detector 13 according to the first embodiment. The terminal end detector 33b performs the process of detecting a voice terminal end from the input signal received from the input control unit 31. As the processes executed by the starting end detector 33a and the terminal end detector 33b, the same detection method used by the first detector 13 according to the first embodiment may be used. When a voice starting end is detected by the starting end detector 33a, information indicating the starting end position is communicated to the input control unit 31. When a voice terminal end is detected by the terminal end detector 33b, information indicating the terminal end position is communicated to the input control unit 31.

The first transmitting unit 34 includes an input signal transmitting unit 34a and a message transmitting unit 34b. The input signal transmitting unit 34a transmits the input signals received from the input control unit 31 to the voice terminal end detection apparatus 40 over the communication network NT, in the same manner as the first transmitting unit 14 according to the first embodiment. The message transmitting unit 34b generates, when the supply of the input signals from the input control unit 31 is stopped because a voice terminal end has been detected by the terminal end detector 33b in the first detector 33, a transmission interruption message indicating that the transmission of the input signal has been interrupted, and transmits the transmission interruption message to the voice terminal end detection apparatus 40 over the communication network NT.

The first receiving unit 35 includes a detection signal receiving unit 35a and a request receiving unit 35b. The detection signal receiving unit 35a receives the terminal end detection signal transmitted from the voice terminal end detection apparatus 40 over the communication network NT in the same manner as the first receiving unit 15 according to the first embodiment. The request receiving unit 35b receives a transmission restart request transmitted from the voice terminal end detection apparatus 40 over the communication network NT. The transmission restart request is transmitted when a voice terminal end is not detected in the received input signals on the voice terminal end detection apparatus 40, in the manner described later. The request receiving unit 35b receives, when a transmission restart request is transmitted from the voice terminal end detection apparatus 40, the transmission restart request, and passes the transmission restart request to the input control unit 31. Upon receiving the transmission restart request, the input control unit 31 restarts supplying the input signals to the first transmitting unit 34, to which the supplying of the input signals has been stopped, by taking out the input signals subsequent to the time at which the transmission is interrupted from the input buffer 32, and passing the signal to the first transmitting unit 34. In this manner, transmission of the input signals from the input signal transmitting unit 34a included in the first transmitting unit 34 to the voice terminal end detection apparatus 40 is restarted.

The voice terminal end detection apparatus 40 includes, as illustrated in FIG. 4, a second receiving unit 41, a second detector 42, and a second transmitting unit 43.

The second receiving unit 41 includes an input signal receiving unit 41a and a message receiving unit 41b. The input signal receiving unit 41a receives the input signals transmitted from the voice starting end detection apparatus 30 over the communication network NT, in the same manner as the second receiving unit 21 according to the first embodiment. The input signals received by the input signal receiving unit 41a are passed to the second detector 42. The message receiving unit 41b receives a transmission interruption message transmitted from the voice starting end detection apparatus 30 over the communication network NT. The transmission interruption message received by the message receiving unit 41b is passed to the second detector 42.

The second detector 42 performs the process of detecting a voice terminal end from the input signals received by the input signal receiving unit 41a, in the same manner as the second detector 22 according to the first embodiment. As the process executed by the second detector 42, the same detection method as that used by the second detector 22 according to the first embodiment may be used. When the second detector 42 detects a voice terminal end, the information is communicated to the second transmitting unit 43. If any voice terminal end is not detected from the input signals received by the input signal receiving unit 41a, and if the transmission interruption message has been received by the message receiving unit 41b, the second detector 42 requests the second transmitting unit 43 to transmit the transmission restart request.

The second transmitting unit 43 includes a detection signal transmitting unit 43a and a request transmitting unit 43b. The detection signal transmitting unit 43a generates a terminal end detection signal indicating that a voice terminal end has been detected, when a voice terminal end is detected by the second detector 42, in the same manner as the second transmitting unit 23 according to the first embodiment, and transmits the terminal end detection signal to the voice starting end detection apparatus 30 over the communication network NT. The request transmitting unit 43b generates, in response to a request from the second detector 42, a transmission restart request for requesting the restart of the transmission of the input signals from the voice starting end detection apparatus 30, and transmits the transmission restart request to the voice starting end detection apparatus 30 over the communication network NT.

A general operation of the voice segment detection system according to the embodiment having such a configuration will now be explained.

When the input signals start being input to the voice starting end detection apparatus 30, the input signals are stored successively in the input buffer 32. At this time, because no voice starting end has been detected, the input signals are passed to the first detector 33, and the starting end detector 33a performs the process of detecting a voice starting end. Once a voice starting end is detected by the starting end detector 33a, the input signals subsequent to the voice starting end are transmitted from the input signal transmitting unit 34a to the voice terminal end detection apparatus 40. The input signals are also kept being passed to the first detector 33, and the terminal end detector 33b is kept performing the process of detecting a voice terminal end, even after a voice starting end has been detected by the starting end detector 33a. If a voice terminal end is detected by the terminal end detector 33b before the detection signal receiving unit 35a receives the terminal end detection signal, the transmission of input signals from the input signal transmitting unit 34a to the voice terminal end detection apparatus 40 is interrupted. The transmission interruption message is then transmitted from the message transmitting unit 34b to the voice terminal end detection apparatus 40.

On the voice terminal end detection apparatus 40, when the input signals subsequent to the voice starting end are received by the input signal receiving unit 41a, the input signals are passed to the second detector 42, and the second detector 42 performs the process of detecting the voice terminal end. If the second detector 42 detects the voice terminal end, a terminal end detection signal is transmitted from the detection signal transmitting unit 43a to the voice starting end detection apparatus 30. On the voice starting end detection apparatus 30, the detection signal receiving unit 35a receives the terminal end detection signal, and the transmission of the input signals from the input signal transmitting unit 34a to the voice terminal end detection apparatus 40 is stopped.

On the voice terminal end detection apparatus 40, if no voice terminal end is detected from the input signals received from the voice starting end detection apparatus 30, and the message receiving unit 41b has received a transmission interruption message, a transmission restart request is transmitted from the request transmitting unit 43b to the voice starting end detection apparatus 30. On the voice starting end detection apparatus 30, the request receiving unit 35b receives the transmission restart request, and the input signals subsequent to the time at which the transmission is interrupted are read from the input buffer 32, and the transmission of the input signals from the input signal transmitting unit 34a to the voice terminal end detection apparatus 40 is restarted. On the voice terminal end detection apparatus 40, the second detector 42 then restarts the process of detecting the voice terminal end, and the operation described above is repeated until a voice terminal end is detected.

Figure 5:
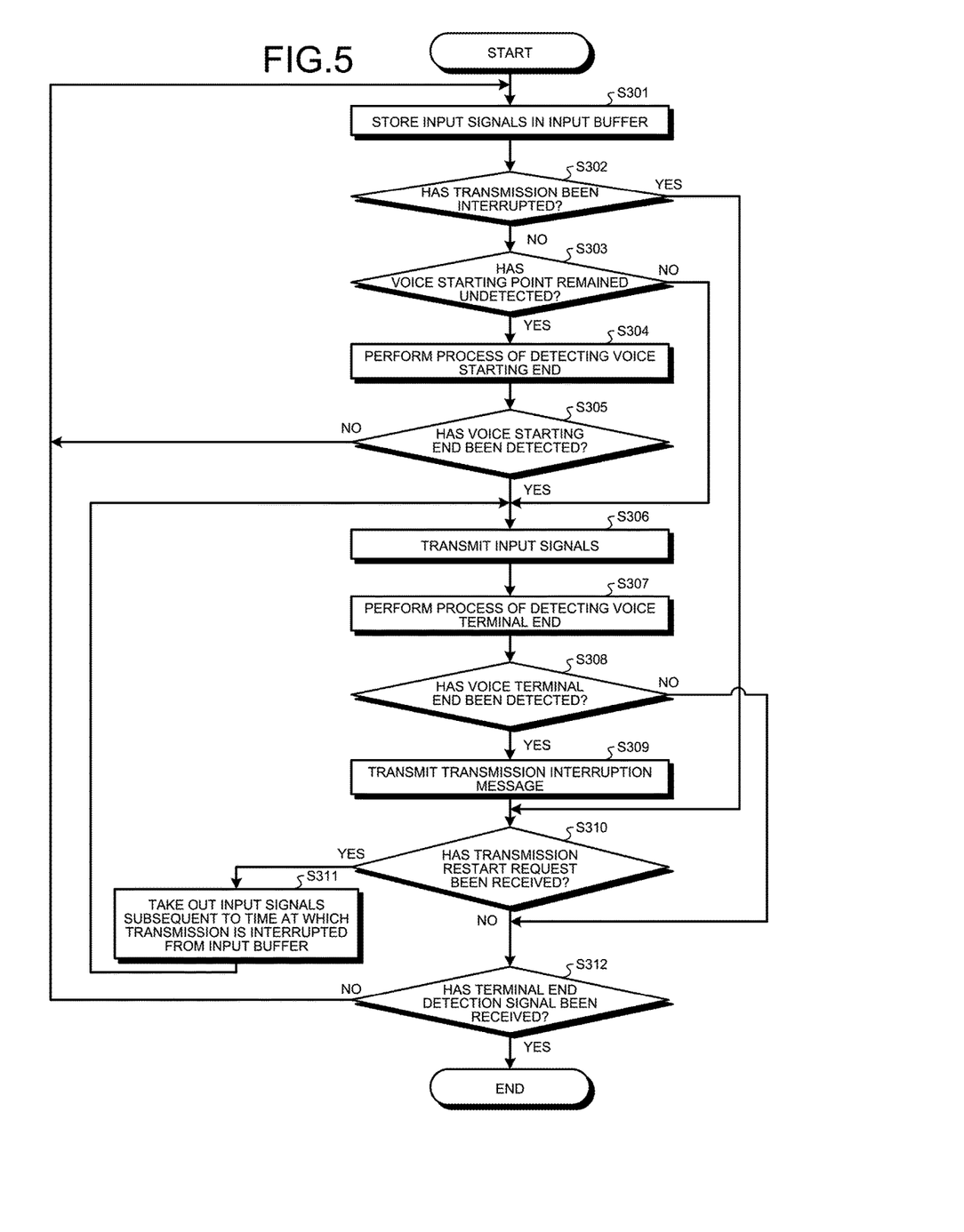
FIG. 5 is a flowchart illustrating an exemplary procedure of a process performed in a voice starting end detection apparatus.

A procedure of a process performed in the voice starting end detection apparatus 30 will now be explained with reference to FIG. 5. FIG. 5 is a flowchart illustrating an exemplary procedure of a process performed in the voice starting end detection apparatus 30. The series of processes illustrated in the flowchart of FIG. 5 is started when input signals are input to the voice starting end detection apparatus 30.

When input signals are input to the voice starting end detection apparatus 30, to begin with, the input control unit 31 stores the input signals successively in the input buffer 32 (Step S301). At this time, the input control unit 31 determines whether the transmission of the input signals to the voice terminal end detection apparatus 40 has been interrupted (Step S302). If the transmission of the input signals has been interrupted (Yes at Step S302), the process is shifted to Step S310. If the transmission of the input signals has not been interrupted (No at Step S302), the input control unit 31 determines whether a voice starting end has remained undetected (Step S303). If a voice starting end has not remained undetected (No at Step S303), the input signals are passed to the first transmitting unit 34, as well as to the first detector 33, and instructs the first detector 33 to detect a terminal end. The process is then shifted to Step S306.

If a voice starting end has remained undetected (Yes at Step S303), the input control unit 31 passes the input signals to the first detector 33, and instructs the first detector 33 to detect a starting end. Upon receiving this instruction, the starting end detector 33a in the first detector 33 executes the process of detecting a starting end from the input signals received from the input control unit 31 (Step S304).

The input control unit 31 then determines whether the starting end detector 33a has detected a voice starting end (Step S305). If a voice starting end has not been detected (No at Step S305), the process is returned to Step S301, and the subsequent process is repeated. If a voice starting end has been detected by the starting end detector 33a (Yes at Step S305), the input control unit 31 passes the input signals subsequent to the detected voice starting end to the first transmitting unit 34. The process is then shifted to Step S306.

At Step S306, the input signal transmitting unit 34a in the first transmitting unit 34 transmits the input signals received from the input control unit 31 (the signals input from the input device such as a microphone, or the signals taken out from the input buffer 32) to the voice terminal end detection apparatus 40 over the communication network NT. Following the procedure described above, the input signals subsequent to the voice starting end detected by the starting end detector 33a are transmitted to the voice terminal end detection apparatus 40. In this embodiment, in parallel with the transmission of the input signals subsequent to the voice starting end, the terminal end detector 33b in the first detector 33 executes the process of detecting a voice terminal end from the input signals received from the input control unit 31, in response to the instruction received from the input control unit 31 (Step S307).

The input control unit 31 then determines whether a voice terminal end has been detected by the terminal end detector 33b (Step S308). If a voice terminal end has not been detected (No at Step S308), the process is shifted to Step S312. If a voice terminal end has been detected by the terminal end detector 33b (Yes at Step S308), the input signal transmitting unit 34a interrupts the transmission of the input signals to the voice terminal end detection apparatus 40, by causing the input control unit 31 to stop supplying the input signals to the first transmitting unit 34. The message transmitting unit 34b then generates a transmission interruption message, and transmits the transmission interruption message to the voice terminal end detection apparatus 40 (Step S309).

The input control unit 31 then determines whether the request receiving unit 35b in the first receiving unit 35 has received a transmission restart request transmitted from the voice terminal end detection apparatus 40 (Step S310). If a transmission restart request has been received (Yes at Step S310), the input control unit 31 takes out the input signals subsequent to the time at which the transmission is interrupted from the input buffer 32, and passes the input signals to the first transmitting unit 34 (Step S311). The process is then returned to Step S306, and the input signals subsequent to the time at which the transmission is interrupted are transmitted from the input signal transmitting unit 34a to the voice terminal end detection apparatus 40. If a transmission restart request has not been received yet (No at Step S310), the process is shifted to Step S312.

At Step S312, the input control unit 31 determines whether the detection signal receiving unit 35a in the first receiving unit 35 has received a terminal end detection signal transmitted from the voice terminal end detection apparatus 40 (Step S312). If the detection signal receiving unit 35a has not received the terminal end detection signal (No at Step S312), the process is returned to Step S301, and the subsequent process is repeated. If the detection signal receiving unit 35a has received the terminal end detection signal (Yes at Step S312), the transmission of the input signals from the input signal transmitting unit 34a to the voice terminal end detection apparatus 40 is stopped, by causing the input control unit 31 to stop supplying the input signals to the first transmitting unit 34, and the series of processes is ended.

Figure 6:
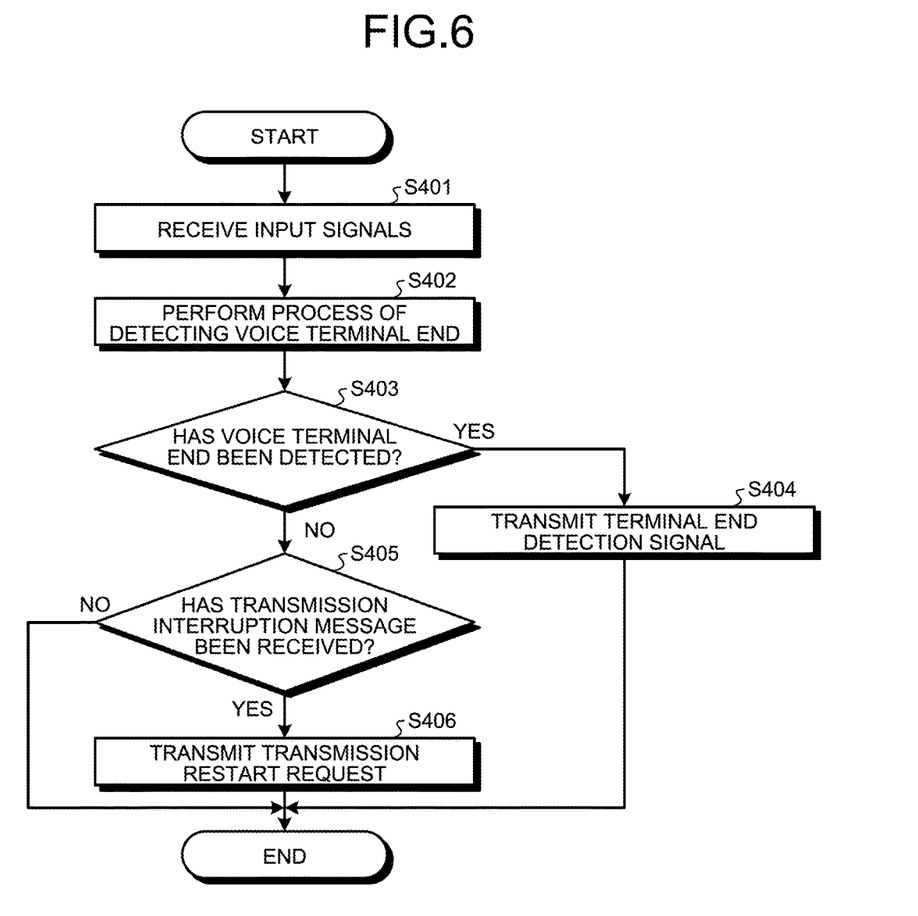
FIG. 6 is a flowchart illustrating an exemplary procedure of a process performed in a voice terminal end detection apparatus.

A procedure of a process performed in the voice terminal end detection apparatus 40 will now be explained with reference to FIG. 6. FIG. 6 is a flowchart illustrating an exemplary procedure of a process performed in the voice terminal end detection apparatus 40. The series of processes illustrated in the flowchart of FIG. 6 is repeated every time the input signals are transmitted from the voice starting end detection apparatus 30 to the voice terminal end detection apparatus 40.

When the input signals are transmitted from the voice starting end detection apparatus 30, to begin with, the input signal receiving unit 41*a* receives the input signals (Step S401), and passes the signals to the second detector 42. The second detector 42 then executes the process of detecting a voice terminal end from the input signals received from the input signal receiving unit 41*a* (Step S402). If a voice terminal end has been detected by the second detector 42 (Yes at Step S403), the detection signal transmitting unit 43*a* generates a terminal end detection signal, and transmits the terminal end detection signal to the voice starting end detection apparatus 30 (Step S404), and the process is ended.

If a voice terminal end has not been detected from the input signals received at Step S401 (No at Step S403), it is then determined whether the message receiving unit 41*b* has received a transmission interruption message from the voice starting end detection apparatus 30 (Step S405). If the message receiving unit 41*b* has not received a transmission interruption message (No at Step S405), the process is ended as it is. If the message receiving unit 41*b* has received a transmission interruption message (Yes at Step S405), the request transmitting unit 43*b* generates a transmission restart request, and transmits the transmission restart request to the voice starting end detection apparatus 30 (Step S406), and the process is ended.

As described above using a specific example, in the voice segment detection system according to the embodiment, the input voice subsequent to a voice starting end detected by the voice starting end detection apparatus 30 is transmitted to the voice terminal end detection apparatus 40, and the voice terminal end detection apparatus 40 is caused to perform the process of detecting a voice terminal end, in the same manner as in the first embodiment. In this embodiment, however, if a voice terminal end is detected on the voice starting end detection apparatus 30, the transmission of the input signals to the voice terminal end detection apparatus 40 is interrupted. If a voice terminal end is then not detected on the voice terminal end detection apparatus 40, the transmission of the input signals from the voice starting end detection apparatus 30 to the voice terminal end detection apparatus 40 is restarted. If a voice terminal end has been detected by the voice terminal end detection apparatus 40, the transmission of the input signals from the voice starting end detection apparatus 30 to the voice terminal end detection apparatus 40 is stopped. Therefore, with the voice segment detection system according to the embodiment, the voice left out without being transmitted can be effectively reduced, while suppressing the amount of communication from the voice starting end detection apparatus 30 to the voice terminal end detection apparatus 40 further, in comparison with the first embodiment.

Supplemental Explanations

The operations of the respective units included in the voice starting end detection apparatuses 10, 30 and the voice terminal end detection apparatuses 20, 40 included in the voice segment detection systems according to the embodiments described above can be implemented by using a general-purpose computer system as basic hardware, for example, and by causing the computer system to execute a predetermined computer program (software). Such a computer program is provided in a manner recorded in a recording medium such as a magnetic disk (such as a flexible disk or a hard disk), an optical disc (such as a compact disc read-only memory (CD-ROM), a compact disc recordable (CD-R), a compact disc rewritable (CD-RW), a versatile digital disc read-only memory (DVD-ROM), a digital versatile disc recordable (DVD±R), a digital versatile disc rewritable (DVD±RW), or a BLU-RAY (registered trademark) disc), or a semiconductor memory. The recording medium for recording the computer program may be any computer-system-readable recording medium, with no limitation to the recording scheme. Furthermore, the computer program may be installed in a computer system in advance, or a computer program distributed over a network may be installed in a computer system as appropriate.

The computer program executed on the computer system has a modular structure including the functional units of the voice starting end detection apparatus 10, 30 or the voice terminal end detection apparatus 20, 40 described above, and, by causing a processor to read and to execute the computer program as appropriate, the functional units of the voice starting end detection apparatus 10, 30 or the voice terminal end detection apparatus 20, 40 are loaded onto a memory, and generated on the memory.

A part or the whole of the functional units of the voice starting end detection apparatus 10, 30 or the voice terminal end detection apparatus 20, 40 may also be implemented using specialized hardware such as an application specific integrated circuit (ASIC) or a field-programmable gate array (FPGA), without limitation to the implementation as a computer program (software).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A voice segment detection system comprising:
   a voice starting end detection apparatus and a voice terminal end detection apparatus that are communicatively connected to each other, wherein
   the voice starting end detection apparatus comprises:
   first processing circuitry configured to function as:
   a first detector that detects a starting end of a voice segment from input signals that are input in a time series, wherein first detector detects a terminal end of the voice segment from the input signals;
   a first transmitting unit that
   transmits, when the starting end is detected, input signals subsequent to the starting end to the voice terminal end detection apparatus, and
   interrupts transmission of the input signals when the terminal end is detected by the first detector, and transmits a transmission interruption message indicating that the transmission of the input signals has been interrupted to the voice terminal end detection apparatus; and a first receiving unit that receives a terminal end detection signal indicating that a terminal end of the voice segment has been detected from the voice terminal end detection apparatus, and receives, when a transmission restart request requesting for restart of the transmission of the input signals is transmitted from the voice terminal end detection apparatus, the transmission restart request, and the voice terminal end detection apparatus comprises:

second processing circuitry configured to function as:

a second receiving unit that receives the input signals subsequent to the starting end from the voice starting end detection apparatus, and receives, when the transmission interruption message is transmitted from the voice starting end detection apparatus, the transmission interruption message;

a second detector that detects the terminal end of the voice segment from the received input signals; and a second transmitting unit that transmits, when the terminal end is detected, the terminal end detection signal to the voice starting end detection apparatus and transmits, when the terminal end is not detected by the second detector and when the transmission interruption message is received by the second receiving unit, the transmission restart request to the voice starting end detection apparatus, and wherein the first transmitting unit stops transmitting the input signals when the first receiving unit receives the terminal end detection signal and transmits, when the first receiving unit receives the transmission restart request, input signals subsequent to time at which the transmission is interrupted to the voice terminal end detection apparatus.

2. The voice segment detection system according to claim 1, wherein the voice starting end detection apparatus further comprises an input buffer that successively stores therein the input signals, and the first transmitting unit transmits, when the first receiving unit receives the transmission restart request, the input signals subsequent to time at which the transmission is interrupted and taken out from the input buffer to the voice terminal end detection apparatus.

3. The voice segment detection system according to claim 1, wherein the second transmitting unit transmits a terminal end detection signal including time information for identifying a position of the terminal end detected by the second detector along a time axis, to the voice starting end detection apparatus.

4. The voice segment detection system according to claim 1, wherein a processing load required for the second detector to detect the terminal end is higher than a processing load required for the first detector to detect the starting end.

5. A voice starting end detection apparatus comprising:

processing circuitry configured to function as:

a detector that detects a starting end of a voice segment and a terminal end of the voice segment from input signals that are input in a time series;

a transmitting unit that transmits, when the starting end is detected, input signals subsequent to the starting end to an external apparatus, and interrupts transmission of the input signals when the terminal end is detected by the detector, and transmits a transmission interruption message indicating that the transmission of the input signals has been interrupted to the external apparatus; and a receiving unit that receives a terminal end detection signal indicating that a terminal end of the voice segment has been detected from the external apparatus, and receives, when a transmission restart request requesting for restart of the transmission of the input signals is transmitted from the external apparatus, the transmission restart request, wherein the transmitting unit stops transmitting the input signals when the receiving unit receives the terminal end detection signal and transmits, when the receiving unit receives the transmission restart request, input signals subsequent to time at which the transmission is interrupted to the external apparatus.

6. A voice terminal end detection apparatus comprising:

processing circuitry configured to function as:

a receiving unit that receives, among input signals input to an external apparatus, input signals that are subsequent to a starting end of a voice segment detected by the external apparatus and that are transmitted from the external apparatus, and receives, when a transmission interruption message indicating that the transmission of the input signals has been interrupted is transmitted from the external apparatus, the transmission interruption message;

a detector that detects a terminal end of the voice segment from the received input signals;

a transmitting unit that transmits, when the terminal end is detected, a terminal end detection signal indicating that the terminal end of the voice segment has been detected to the external apparatus and transmits, when the terminal end is not detected by the detector and when the transmission interruption message is received by the receiving unit, a transmission restart request requesting for restart of the transmission of the input signals to the external apparatus.

* * * * *